Feb. 10, 1959  W. D. LUDWIG  2,872,944
HAND VALVE
Filed Dec. 4, 1953  2 Sheets-Sheet 2
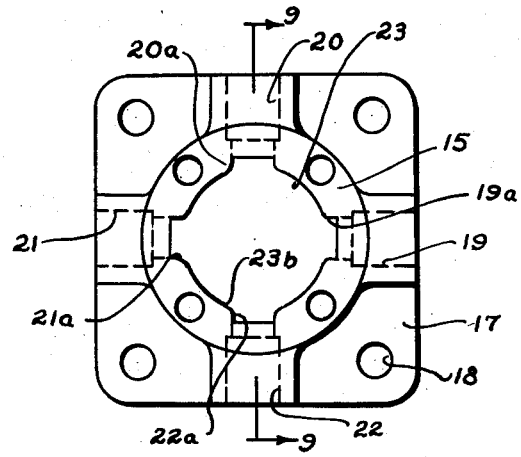
Fig. 5
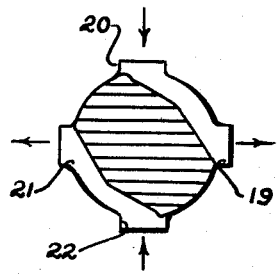
Fig. 6
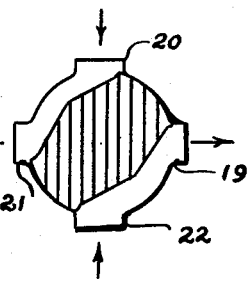
Fig. 7
Fig. 8
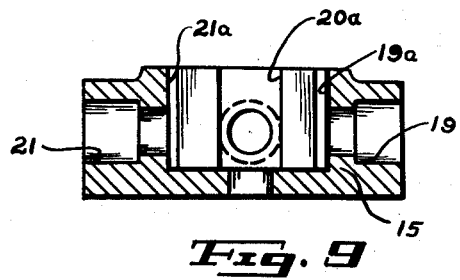
Fig. 9
INVENTOR.
WALTER D. LUDWIG
BY
*Thos. Donnelly*
ATTORNEY

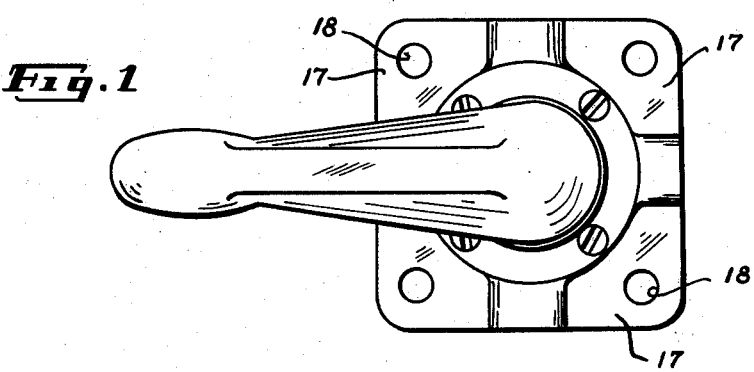
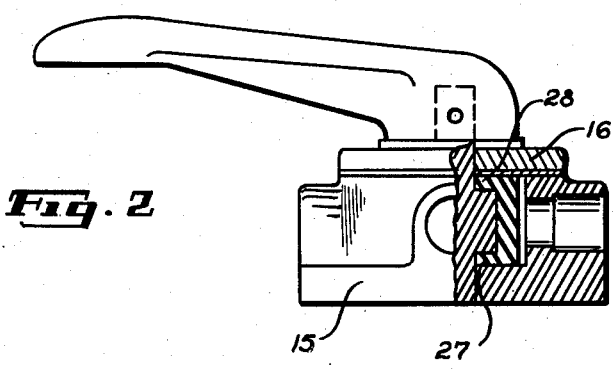
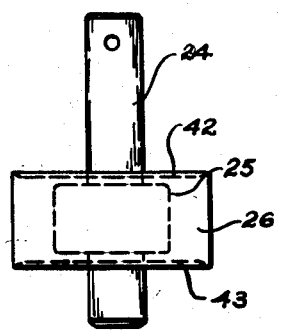
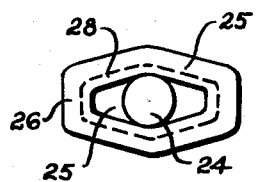
INVENTOR.
WALTER D. LUDWIG

United States Patent Office 2,872,944
Patented Feb. 10, 1959

2,872,944

HAND VALVE

Walter D. Ludwig, Oak Park, Mich.

Application December 4, 1953, Serial No. 396,092

2 Claims. (Cl. 137—625.47)

My invention relates to a new and useful improvement in a hand valve used for controlling the flow of fluid through various conduits. The valve is particularly adapted for controlling the flow of air under pressure through various air lines.

While the valve is referred to as a hand valve it, it is believed, will appear that the mechanism may also be used on a power operated valve.

It is an object of an invention to provide a control valve of this class which will be simple in structure, economical of manufacture, durable and highly efficient in use.

It is another object of the present invention to provide a valve having a stop cock rotatable in a housing having inlet and outlet ports and provided with a contacting layer of yieldable material, such as rubber or the like, so that when the cock is moved to closing position this yieldable material will overlie the port and the portion thereof will flow into the port to assure a proper closing.

Other objects will appear hereafter.

It is recognized that various modifications and changes will be made in the detail of structure illustrated without departing from the invention and it is intended that the present disclosure shall be considered to be but the preferred embodiment.

Forming a part of this application are drawings in which,

Fig. 1 is a top plan view of the invention,

Fig. 2 is a side elevational view of the invention with parts broken away and parts shown in section, Fig. 3 is a side elevational view of the valve cock used in the invention, Fig. 4 is an end elevational view of the valve cock used in the invention, Fig. 5 is a plan view of the valve housing with the cover plate removed.

Fig. 6, Fig. 7 and Fig. 8 are schematic views illustrating different positions of the valve cock.

Fig. 9 is a sectional view taken on line 9—9 of Fig. 5.

As shown in the drawings the invention comprises the housing 15 on which is secured a cover or cap 16, this housing 15 being provided with the flanges 17 through which are formed openings 18 whereby the housing may be secured to a suitable support.

Leading from the interior of the housing 15 are the ports 19, 20, 21 and 22, each communicating at its inner end with an entry passage or vestibule 19a, 20a, 21a and 22a respectively. The inner ends of each of these vestibules 19a et cetera are rounded off as at 23b so that the inner surface 23 of the housing, which is struck on an arc, does not end abruptly at the vestibules 19a et cetera.

A valve cock is provided which embodies a stem 24 formed from suitable material and on which, between the ends thereof, is formed a boss 25.

A covering 26 is provided for the faces of this boss 25 and is provided with the inwardly extended flange portions 27 and 28 so that the boss is substantially covered by this material. The material from which this covering is formed is of yieldable material and preferably rubber. As shown in Fig. 4 the covering material is of uniform thickness around the sides of the boss. As shown in Fig. 3, the end faces of this covering are formed concave to provide the recesses 42 and 43. By forming the covering in this manner, a better seal is obtained on the periphery and friction is reduced due to the flexing of the outer portion of the covering.

As shown in the schematic views of Figs. 6, 7 and 8, the valve cock rotates in the valve housing. In Fig. 6, the ports 21 and 22 are in communication and likewise ports 19 and 20 are in communication. In Fig. 8, the ports 19 and 22 are in communication and the ports 20 and 21 are in communication. In Fig. 7, the valve cock is moved to fully closed position in which none of the various ports are in communication. It will be noted that the covering 26 in Fig. 7 has flowed into the vestibules 20a and 22a as at 33 and 34. It will also be noted that the covering 26 overlies these ports as well as flowing into the vestibules so that there is effected a very tight seal. As the valve is rotated and the covering passes along the arcuate surface 23, due to the rounding of the corners as at 23b, very little wear is effected on the covering and the rounded corners 23b facilitate the flow of the flexible covering into the vestibules to effect this tight seal.

As shown in Fig. 9, the vestibules 19a, 20a and so forth are formed rectangularly. These vestibules are recesses which open through the upper end of the housing 15.

What I claim is:

1. A valve of the class described, comprising: a housing; a cylindrical chamber in said housing having top, bottom and side walls; inlet and outlet ports in said housing communicating with said chamber; an oblong stop cock rotatably mounted in said chamber for opening and closing said ports; a layer of yieldable material covering the outer surfaces of said stop cock; the dimensions of said yieldable material in the free state being larger than the corresponding dimensions of said chamber, whereby said yieldable material will be in compression in said chamber and will continuously engage said chamber walls at all positions of the stop cock to provide an effective seal therebetween.

2. A valve of the class described, comprising: a housing, a cylindrical chamber in said housing having top and bottom enclosure walls; inlet and outlet ports in said housing communicating with said chamber; an oblong stop cock rotatably mounted in said cylindrical chamber for opening and closing said ports; a layer of yieldable material covering the outer surfaces of said stop cock; the dimensions of said yieldable material in the free state being larger than the corresponding dimensions of said cylindrical chamber, whereby said yieldable material will be in compression in said chamber and will continuously engage the chamber walls and sides, and divide the chamber into two portions which are sealed from each other at all positions of the stop cock.

References Cited in the file of this patent

UNITED STATES PATENTS

| | | |
|---|---|---|
| 109,730 | Hanks | Nov. 29, 1870 |
| 2,431,593 | Strike | Nov. 25, 1947 |
| 2,527,341 | Walter | Oct. 24, 1950 |
| 2,534,577 | Courtot | Dec. 19, 1950 |

FOREIGN PATENTS

| | | |
|---|---|---|
| 143,999 | Sweden | of 1954 |